(12) United States Patent
Descubes et al.

(10) Patent No.: US 12,071,854 B2
(45) Date of Patent: Aug. 27, 2024

(54) CURVILINEAR COUPLING FOR AIRCRAFT TURBOMACHINERY

(71) Applicant: SAFRAN HELICOPTER ENGINES, Bordes (FR)

(72) Inventors: Olivier Pierre Descubes, Moissy-Cramayel (FR); Frédéric Ferdinand Jacques Batlle, Moissy-Cramayel (FR)

(73) Assignee: Safran Helicopter Engines, Bordes (FR)

( * ) Notice: Subject to any disclaimer, the term of this patent is extended or adjusted under 35 U.S.C. 154(b) by 387 days.

(21) Appl. No.: 17/438,339

(22) PCT Filed: Mar. 11, 2020

(86) PCT No.: PCT/FR2020/000053
§ 371 (c)(1),
(2) Date: Sep. 10, 2021

(87) PCT Pub. No.: WO2020/183075
PCT Pub. Date: Sep. 17, 2020

(65) Prior Publication Data
US 2022/0178273 A1 Jun. 9, 2022

(30) Foreign Application Priority Data

Mar. 12, 2019 (FR) ...................... 1902529

(51) Int. Cl.
*F16D 21/04* (2006.01)
*F01D 5/02* (2006.01)
(Continued)

(52) U.S. Cl.
CPC ........... *F01D 21/045* (2013.01); *F01D 5/026* (2013.01); *F01D 5/066* (2013.01); *F02C 3/107* (2013.01);
(Continued)

(58) Field of Classification Search
CPC ........ F01D 21/045; F01D 5/026; F01D 5/066; F02C 3/107; F02C 7/36; F16D 1/10;
(Continued)

(56) References Cited

U.S. PATENT DOCUMENTS

| | | | |
|---|---|---|---|
| 7,588,385 B2 * | 9/2009 | Sugata | F16D 11/14 |
| 2003/0017878 A1 | 1/2003 | Muju et al. | |
| 2017/0254295 A1 | 9/2017 | Moster et al. | |

FOREIGN PATENT DOCUMENTS

| | | | | |
|---|---|---|---|---|
| EP | 3 170 971 A1 | | 5/2017 | |
| GB | 530 144 | * | 12/1940 | ...................... 403/11 |
| SU | 767416 | * | 9/1980 | ...................... 403/364 |

OTHER PUBLICATIONS

English translation of Written Opinion mailed Aug. 20, 2020, issued in corresponding International Application No. PCT/FR2020/000053, filed Mar. 11, 2020, 6 pages.

(Continued)

*Primary Examiner* — Greg Binda
(74) *Attorney, Agent, or Firm* — CHRISTENSEN O'CONNOR JOHNSON KINDNESS PLLC

(57) ABSTRACT

A toothed coupling mechanism for an assembly of rotating elements of an aircraft gas turbine engine includes a pair of coupling halves having an axial toothed coupling interface therebetween. Each coupling half has a plurality of splined teeth inter-engaged about an axis for transmitting torque therebetween. A protrusion is located on one of the splined teeth of one of the coupling halves. A splined tooth of the other coupling half comes into contact with the protrusion in a situation of uncoupling of said coupling halves.

7 Claims, 4 Drawing Sheets

(51) Int. Cl.
  *F01D 5/06* (2006.01)
  *F01D 21/04* (2006.01)
  *F02C 3/107* (2006.01)
  *F02C 7/36* (2006.01)
  *F16D 1/10* (2006.01)

(52) U.S. Cl.
  CPC ................... *F02C 7/36* (2013.01); *F16D 1/10* (2013.01); *F05D 2240/61* (2013.01); *F05D 2250/182* (2013.01); *F05D 2260/4031* (2013.01); *F05D 2260/902* (2013.01); *F16D 2001/103* (2013.01); *Y10T 403/16* (2015.01); *Y10T 403/559* (2015.01); *Y10T 403/7045* (2015.01)

(58) Field of Classification Search
  CPC ........... F16D 2001/103; F05D 2240/61; F05D 2250/182; F05D 2260/4031; F05D 2260/902; Y10T 403/16; Y10T 403/559; Y10T 403/7045
  USPC ............ 403/114, 298, 364, 11; 415/1, 122.1
  See application file for complete search history.

(56) References Cited

OTHER PUBLICATIONS

International Search Report mailed Aug. 20, 2020, issued in corresponding International Application No. PCT/FR2020/000053, filed Mar. 11, 2020, 6 pages.

\* cited by examiner

CURVILINEAR COUPLING FOR AIRCRAFT TURBOMACHINERY

FIELD OF THE DISCLOSURE

The present disclosure relates generally to coupling mechanisms for aircraft gas turbine engines and more specifically to couplings used in the assembly of components comprising rotating elements (or rotor elements), such as impellers, turbine wheels, and couplings on areas of such turbomachines with highly stressed components.

BACKGROUND

The present disclosure is directed to toothed coupling mechanisms for assembling rotating elements of an aircraft gas turbine engine.

In this context, a type of mechanism is known comprising: a pair of coupling halves having a bearing interface therebetween; each of the coupling halves thereby having a plurality of concentric splined teeth inter-engaged about an axis, for transmitting torque therebetween, as in a curvic coupling.

For the purposes of this application, the term "bearing interface" is taken to mean axial toothed coupling.

In an aircraft gas turbine engine, curvic couplings of this type are intended for the assembly of rotating components and have been developed to meet the need for permanent coupling mechanisms requiring extreme precision, maximum load capacity and relatively economical production rates.

A curvic coupling provides a precise, compact and self-contained assembly in which the splined teeth act as centring and driving devices. The most widely used type of curvic coupling in gas turbine engines is the fixed curvic coupling. The fixed curvic coupling can be described as a precision face spline with teeth having a high degree of tooth spacing accuracy, fine surface finish and precise axial positioning.

A shouldered shaft then simply serves as a tie rod and does not interfere with the centring function of the curved teeth.

The design of the curvic coupling itself depends on several variables, some of which include the amount of torque required to be transmitted through the coupling, the shear load and load limits of the materials used in the couplings, and the amount of tie rod tension required to maintain close axial engagement between the inter-assembled components, under all operating conditions.

In the event of a tie rod failure, there is a high risk that the internal forces will lead to disengagement of the spline teeth.

On a turbomachine as aforementioned, the rotating elements of the coupling mechanism equipped with such teeth, typically via curvic couplings, may consist of (the rotors of) a high-pressure turbine (HPT) and (a) compressor so inter-assembled.

However, if a disengagement occurs between the splined teeth of the coupling halves (the cause may be a break of the tie rod), the high-pressure turbine is no longer subject to the resisting torque of the compressor. As long as the HPT continues to be fed by the aerodynamic flow entering the turbomachine, this can lead to a potential overspeed situation that is difficult to quantify, with potentially very serious consequences.

Of course, it seems that a tie rod breakage while the turbomachine is in operation would a priori lead to a blockage of the above-mentioned rotating elements. However, the sequence between tie-rod failure and blockage is not controlled, so what may occur in the turbomachine before blockage remains a potential hazard.

SUMMARY

The proposal elaborated in the disclosure aims at the implementation of a coupling mechanism designed to ensure that the splined teeth of the coupling halves do not disengage completely, in particular in case of a so-called tie rod break.

More specifically, it is thus proposed that the aforementioned toothed coupling mechanism, with its pair of coupling halves each having a plurality of splined teeth, is such that it further comprises a protrusion:
  located, away from the axis, on one of the splined teeth of one of the coupling halves, and
  with which one splined tooth of the other coupling half will come into contact in a situation of uncoupling of the coupling halves.

The expression "a protrusion" is to be understood as at least one protrusion.

However, with a single protrusion (or a single tooth of one and/or the other of the two coupling halves thus provided), hyperstatism will be avoided and the expected relative tilting or pivoting, around the protrusion, between the coupling halves will be made safe.

As the protruding safety device is directly associated with the linkage, it will be systematically activated when the splined teeth disengage.

Furthermore, in the event of such an initiation of uncoupling by spreading along the axis, the protrusion on the distal end will create a tilting zone of one of the coupling halves, thus of one of the rotating elements, with respect to the other, with a consequent misalignment of this element. This should cause friction against parts of the stator of the turbomachine, leading to heating as a result of the contact, which will lead to braking of the rotor.

Since the conditions of uncoupling (time, ambient conditions, speed of the rotating elements, etc.) are unpredictable, it may be preferable for the protrusion to be located on the free end not of a predefined splined tooth, but of any of these splined teeth.

If this is observed, a batch of several toothed coupling mechanisms of rotating elements of turbomachines will statistically have protrusions located at different angular locations depending on the rotating elements and/or the turbomachine.

With a stub positioning without a preferred angular location, it will also be possible to freely perform the positioning operation (proper angular positioning between stator parts, such as two discs), during the balancing of this rotor.

Furthermore, in order to avoid inappropriate friction at the coupling point, while the turbomachine is operating normally, while at the same time promoting angular support once uncoupling has been initiated, it is advisable for the protrusion to protrude from the free end of the splined tooth in question, at the point of a shoulder which surrounds it.

A distal, free part of a tooth of the rotating element not provided with a protrusion will then, at a time of uncoupling, come to rest on the shoulder, at the junction between the protrusion and the tooth where this protrusion is located (see FIG. 5 attached).

And if the protrusion has a perimeter entirely surrounded by such a shoulder, it will be possible to avoid any friction in the rounding of the tooth bottoms where the protrusion will naturally be placed, except in critical situations.

In connection with the above, a method for controlling the consequences of uncoupling between the aforementioned coupling halves is also contemplated here.

As already mentioned, in this method and at the start of axial uncoupling, a relative pivoting between the coupling halves will be brought about via the protrusion, which will therefore have been positioned on one of the splined teeth, away from the nominal axis (X) of rotation.

The disclosure will, if necessary, be better understood and other details, characteristics and advantages of the disclosure will become apparent upon reading the following description as a non-limiting example with reference to the appended drawings.

DETAILED DESCRIPTION

Figure 1:
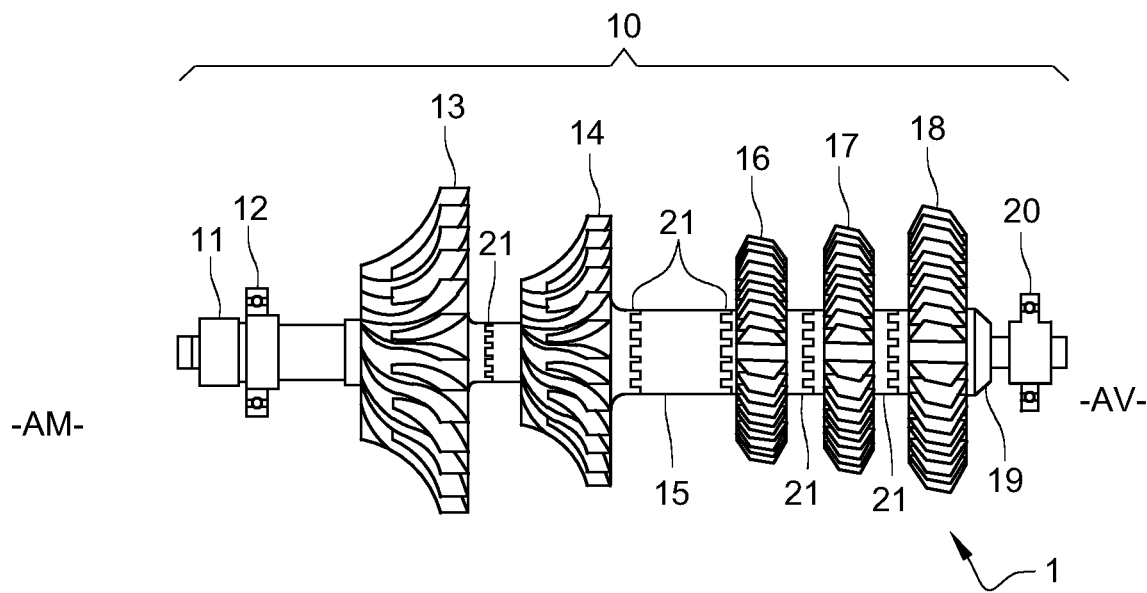
FIG. 1 shows a side view of the rotating elements of a typical gas turbine engine showing curvic couplings.

In the attached drawings, the same numerical references refer to identical parts in all views. In particular in FIG. 1, the schematic side view shows rotating elements 10 of an aircraft gas turbine engine 1. The rotating elements 10 are mounted on a stepped shaft 11 with bearings 12 and 20 at each end. The stepped shaft 11 extends along the conventional axis X of the turbomachine 1 around which the rotors of the compressor part and the turbine part of the turbomachine are rotatably mounted.

Figure 2:
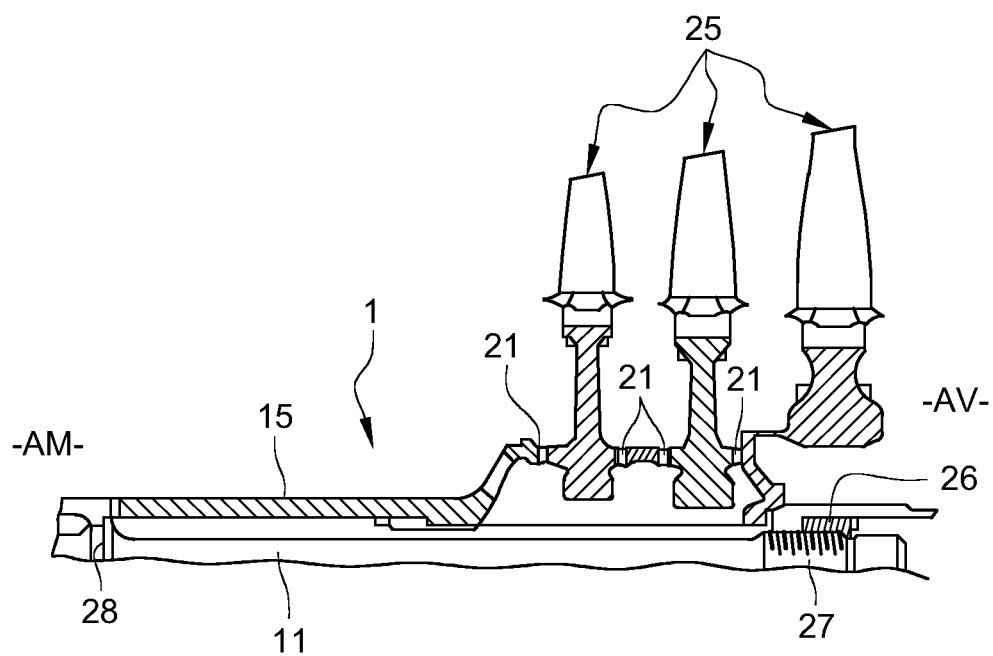
FIG. 2 is a cross-sectional view showing the attachment of the wheels of the turbomachine of FIG. 1 by means of curvic couplings.

This rotating assembly, which may comprise, along the X axis and from upstream (AM) to downstream (AV), first and second impeller stages 13 and 14, a coupler 15, first, second and third impeller stages 16, 17, 18 and an end cap 19, may be mounted on the stepped shaft 11 by means of curvic couplings 21 and tie rods and nuts (shown in FIG. 2).

The cross-sectional detail in FIG. 2 shows how turbine wheels of the turbomachine 1 can be mounted only on a curvic coupling 21. The curvic coupling can be of the fixed type.

The stepped shaft 11, which has a smaller diameter than the axial central passages of the turbine wheel 25 and the coupler 15, is inserted through the central passages.

When the turbine wheels 25 and coupler 15 are arranged in the appropriate locations, a tie nut 26 located on the end of the stepped shaft 11 can be fitted onto the threaded segment 27 to maintain the appropriate axial compression of the turbine wheels 25 and coupler 15 against the shoulder 28.

The stepped shaft 11 can be used simply as an axial tie rod and does not interfere with the centring action of the teeth of the curvic coupling 21.

Other components of the gas turbine engine, such as compressor wheels (not shown), can be assembled in the same way.

Figure 3:
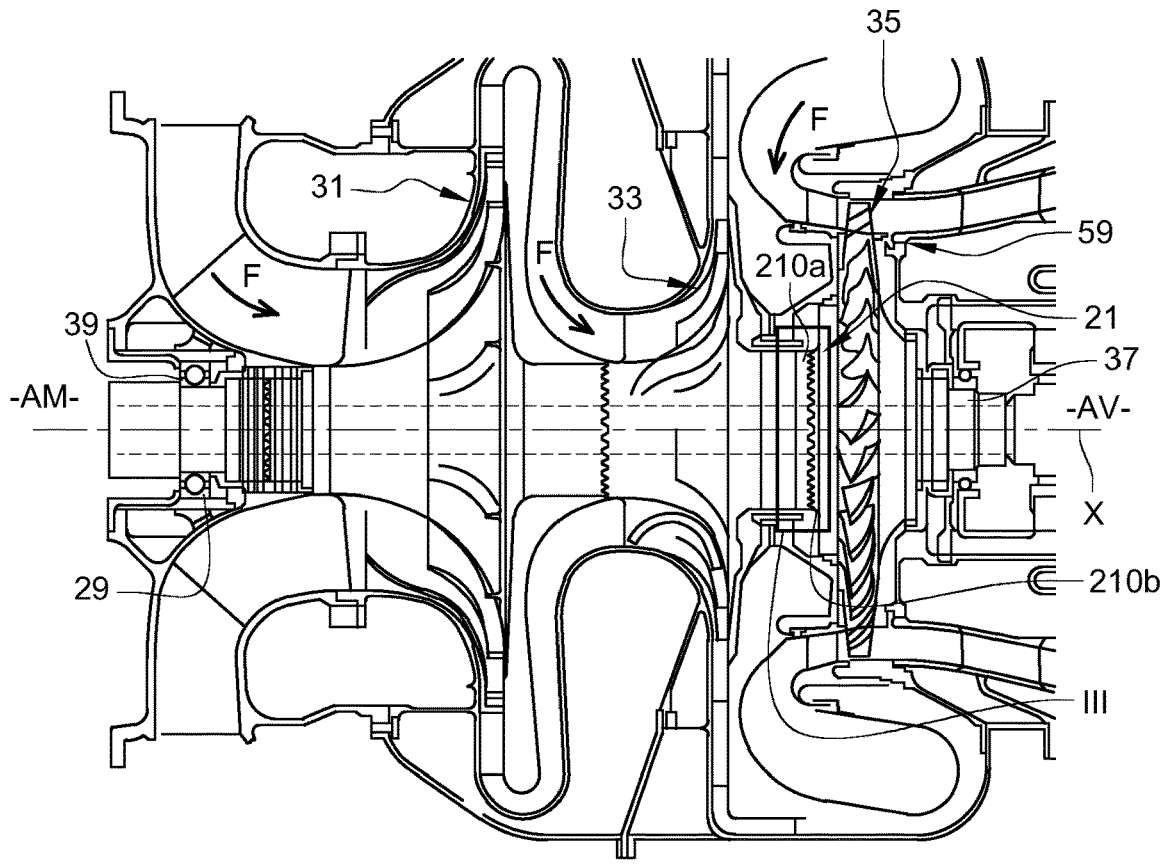
FIG. 3 shows an alternative arrangement to that of FIGS. 1 and 2, still with a tie rod and curvic couplings.

In FIG. 3, the assembly, relatively close to the previous one and still relating to an aircraft gas turbine engine, if it does not show a tie rod, illustrates a tubular shaft 29 passing through a rotating assembly comprising, successively, axially and from upstream (AM) to downstream (AV), low pressure compressor 31, high pressure compressor 33 and high pressure turbine (HPT) 35 rotors (wheels). The hollow shaft 29 is threaded at at least one end for axial engagement with the axial tie rod nut 37. On the opposite axial side (on the left in FIG. 3), a shoulder 39 or similar is supported on the rotor 31. The curvic coupling 21, which is engaged and compressed by the tie rod when the nut is torqued, ensures the alignment along the X axis of the shaft 29, it being specified that, in the present example of a turbomachine, known as a through shaft, another shaft (not shown) linked to the low pressure turbine rotor (not shown) which axially follows the high pressure turbine rotor 35, axially passes through the shaft 29 which therefore functionally links the compressor rotor 33 and the turbine rotor 35.

As understood, it is a breakage of a tie rod as mentioned above, or the excessive loosening of the nut of this tie rod, such as nut 26 in FIG. 2, which is the feared event in this case and whose frequent consequences the disclosure aims to counteract, due to a significant risk of overspeed.

Indeed, for example in connection with an arrangement such as FIG. 3, if an axial disengagement (see arrows 41 FIG. 5) between the coupling halves 210a, 210b of a curvic coupling 21 becomes effective, the high-pressure turbine rotor 35 is no longer subject to the resistive torque of the compressor rotor 33 and continues to be powered by the aerodynamic flow F flowing through it, which may lead to a potential overspeed situation of the high-pressure turbine rotor 35 that is difficult to quantify.

The disclosure is directed to the provision of a device (50) which ensures a systematic sequence which, for example in connection with an arrangement as in FIG. 3 (but any curvic coupling is concerned, such as those 21 in FIGS. 1, 2), ensures that in the example the rotor of the high pressure turbine 35 remains in contact with static parts (hereinafter one of the teeth, 45b1, of the coupling half 210a on the rotor side of the high pressure compressor 33), and this in a deterministic manner, following a tie rod break.

Figure 4:
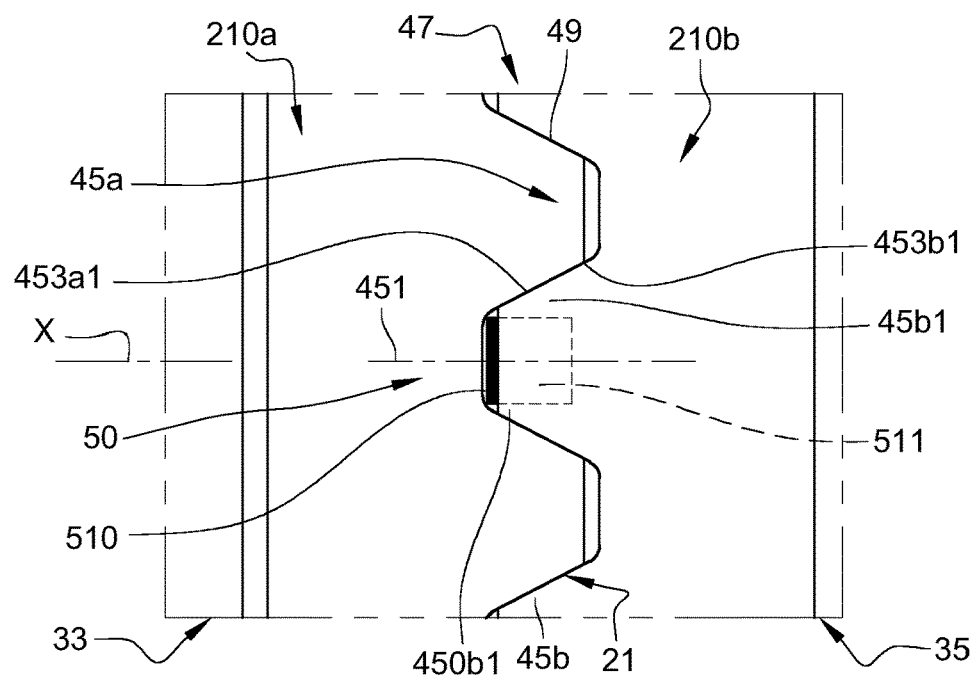
FIG. 4 shows an enlargement of the curvilinear area III (reinforced line added) of FIG. 3, in the coupled state (as in FIG. 3)
Figure 5:
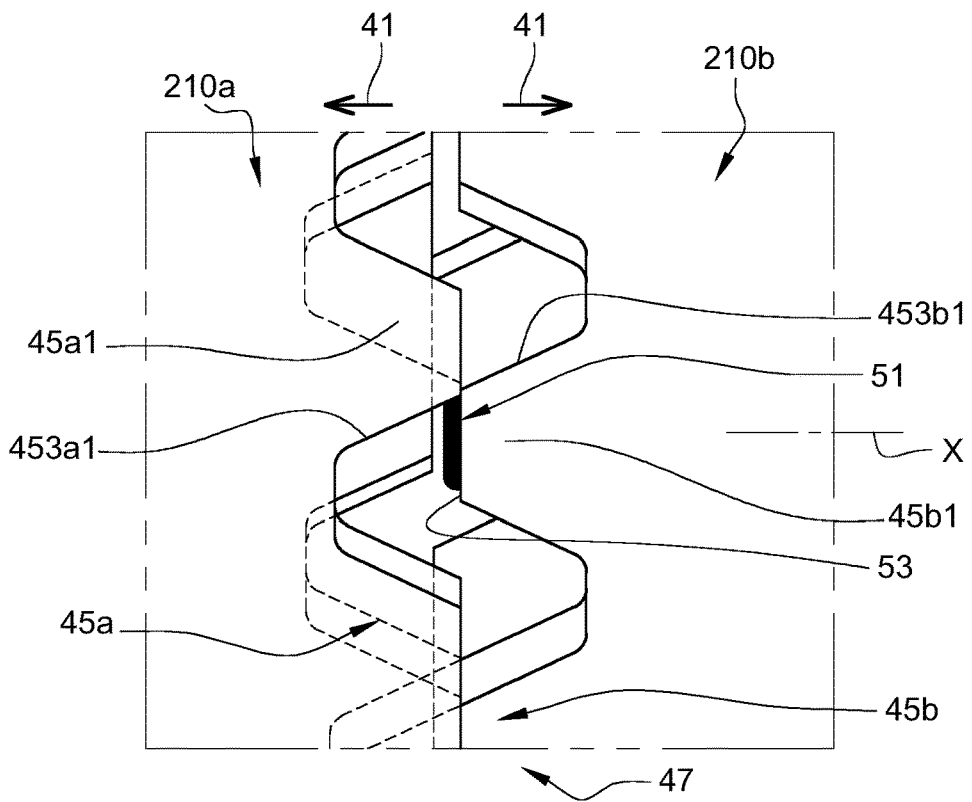
FIG. 5 shows an enlargement of the curvilinear area III (reinforced line added) of FIG. 3, in the uncoupled state.

Combining FIG. 3 and its local enlargements of the curvic coupling 21 of FIGS. 4 and 5, this shows a toothed coupling mechanism 47 for an assembly of rotating elements (in the example compressor rotors 33 and turbine rotors 35) of a turbomachine, the mechanism comprising:

in addition to a pair of coupling halves 210a, 210b having a bearing interface 49 (or an axial toothed coupling) between them (in the coupled situation; FIG. 4), a protrusion 51 by means of which it will thus be possible to control the consequences of a disengagement occurring on the coupling mechanism, following a tie rod break.

In the figures where it appears, the protrusion 51 is marked in black, so that it can be clearly seen, in particular its visible outer contour.

It is specified that each of the coupling halves comprises, as already noted, a plurality of concentric splined teeth 45*a*, 45*b* inter-engaged about the X axis, for transmitting torque therebetween, when the tie rod is in good condition.

The protrusion 51 is located, away from the X-axis—thus off-axis—on one of the splined teeth (such as 45*b*1) of one of the coupling halves: in the preferred example and as shown in FIGS. 4 and 5, the tooth 45*b*1 of the turbine rotor 35 side of coupling half 210*b*.

It will be understood that it is with this protrusion 51 that the splined tooth (45*a*1 in the example) of the other coupling half (210*a* in the example) comes into contact in a situation of uncoupling of the the coupling halves; see FIG. 5.

Although an alternative location on the affected tooth is possible, it is advisable that:
- each splined tooth has an axial free (or distal) end, such as the free end 450*b*1 of tooth 45*b*1 (FIG. 4),
- the protrusion 51 be located on (at) this free end 450*b*1.

Thus, the protrusion 51 may be centred on the elevation axis of the tooth in question—axis 451, parallel to the X axis, of tooth 45*b*1 in the example (FIGS. 4, 6)—and thus stand away from the interface where the sloping side walls of two adjacent teeth, respectively of one and the other of the coupling halves 210*a*, 210*b*, are in mutual engagement, in a (nominal) coupling situation; see the side walls 453*a*1, 453*b*1 of the respective (circumferentially) adjacent teeth 45*a*1, 45*b*1; see FIGS. 4, 5.

Alternatively, one may imagine, on these side walls, a pair of inter-engaged hollows and protrusions (or shoulders), in the coupling state, and offset parallel to the X axis and circumferentially, in the axial uncoupling state.

At least in the presence of a protrusion 51 located at the free end of the tooth, such as 450*b*1, this protrusion may be formed:
- as a pin 510 secured to the relevant splined tooth, such as 45*b*1; see FIG. 4,
- or as an integral part of the splined tooth, which it then extends in relation to the other splined teeth of its coupling half; see FIG. 5.

The free or distal end 451 here extends in a plane transverse to the X axis; this applies moreover to all the teeth of the same coupling half 210*a*, 210*b*, which all extend in the same plane.

Fixing may be done by partial, tight engagement of the pin 510 in a hole 511. In the presence of such a hole parallel to the X-axis of the carrier tooth, the pin 510 will be located at the free end of this tooth.

In order to avoid inappropriate friction at the side walls 453*a*1, 453*b*1 of the coupling when the turbomachine is operating normally, and to promote angular support once uncoupling has been initiated, it is proposed, as illustrated in FIGS. 4 and 5, that the protrusion 51 should project from the free end 450*b*1 of the splined tooth 45*b*1 in question, at the location of a shoulder 53 which surrounds this protrusion 51.

If the perimeter of the protrusion 51 is entirely surrounded by the shoulder 53, the control of the uncoupling will be even more reliable, without favouring an angle of approach of the adjacent tooth (such as 45*a*1) with respect to the tooth bearing the protrusion 51.

As already mentioned, with a single protrusion 51 located on one and only one of the splined teeth, it will be ensured that tilting is created around only one area (that of the protrusion 51) and will favour positioning.

There will then be no preferential angular position for positioning the protrusion 51 about the X axis.

It will be understood that the disclosure therefore proposes a solution for seeking to control the consequences of uncoupling on an axial toothed coupling mechanism of an aircraft gas turbine engine rotating element assembly, this uncoupling being manifested in this case by the relative axial spacing (see FIG. 4 and then FIG. 5) between the two aforementioned coupling halves 210*a*, 210*b*.

Figure 6:
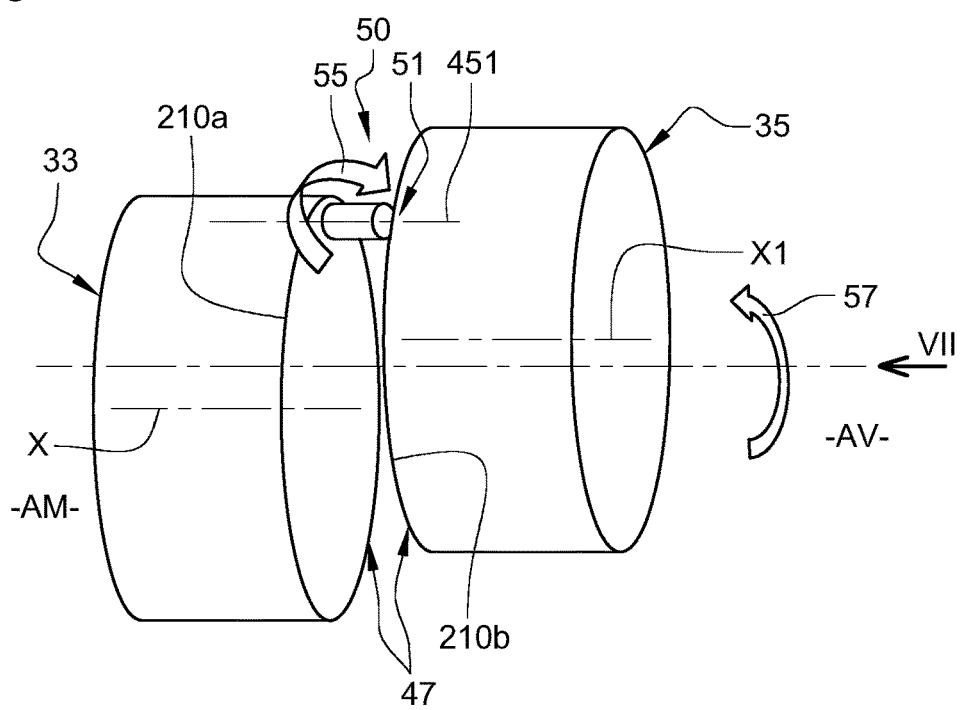
FIG. 6 shows the tilting effect caused by the above-mentioned protrusion on the two mobile parts in question (here 33 and 35)

In practice, what will happen at the start of such axial uncoupling is that, with the protrusion 51 under consideration located on one of the splined teeth away from the X axis, a relative pivoting between the coupling halves 210*a*, 210*b* will occur about the protrusion, as shown by arrows 55 (initiation of pivoting/tilting at a protrusion 51) and 57 (misalignment of the two coupling halves relative to each other; respective axes 451 and X); FIG. 6. The X-axis of the high-pressure turbine rotor 35 has become X1.

Figure 7:
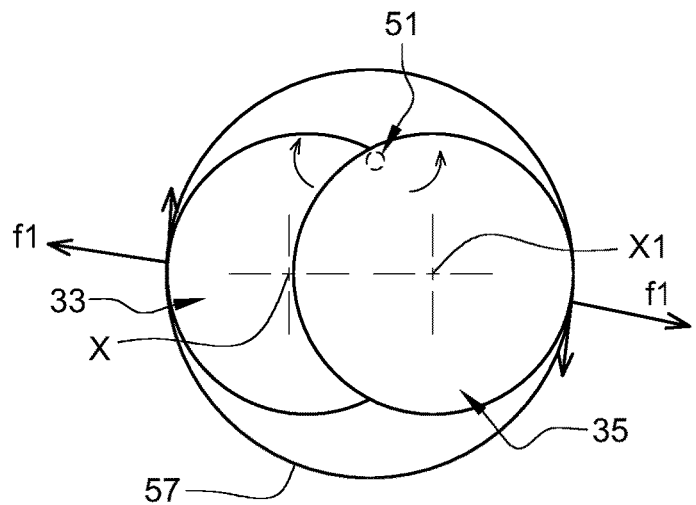
FIG. 7 shows a view from downstream (AV) to upstream (AM), see arrow VII in FIG. 6, of the same two mobile parts following disengagement of curvic couplings and with the protrusion (51) engaging a cooperating area of one of the teeth of the other coupling half.

In this example, friction will occur between the high-pressure turbine rotor 35 and the labyrinth seal 59—its casing 57 (FIGS. 3 and 7)—in the immediate vicinity of which the high-pressure turbine rotor 35 rotates (about the X axis) during normal operation.

It is specified that this labyrinth seal 59, which comprises two lips 63, 65, one axial, the other radial, forms a chicane at the radially inner limit of the vein 67 into which the flow F of combustion gases has been directed from the outlet of a combustion chamber 61.

Figure 8:
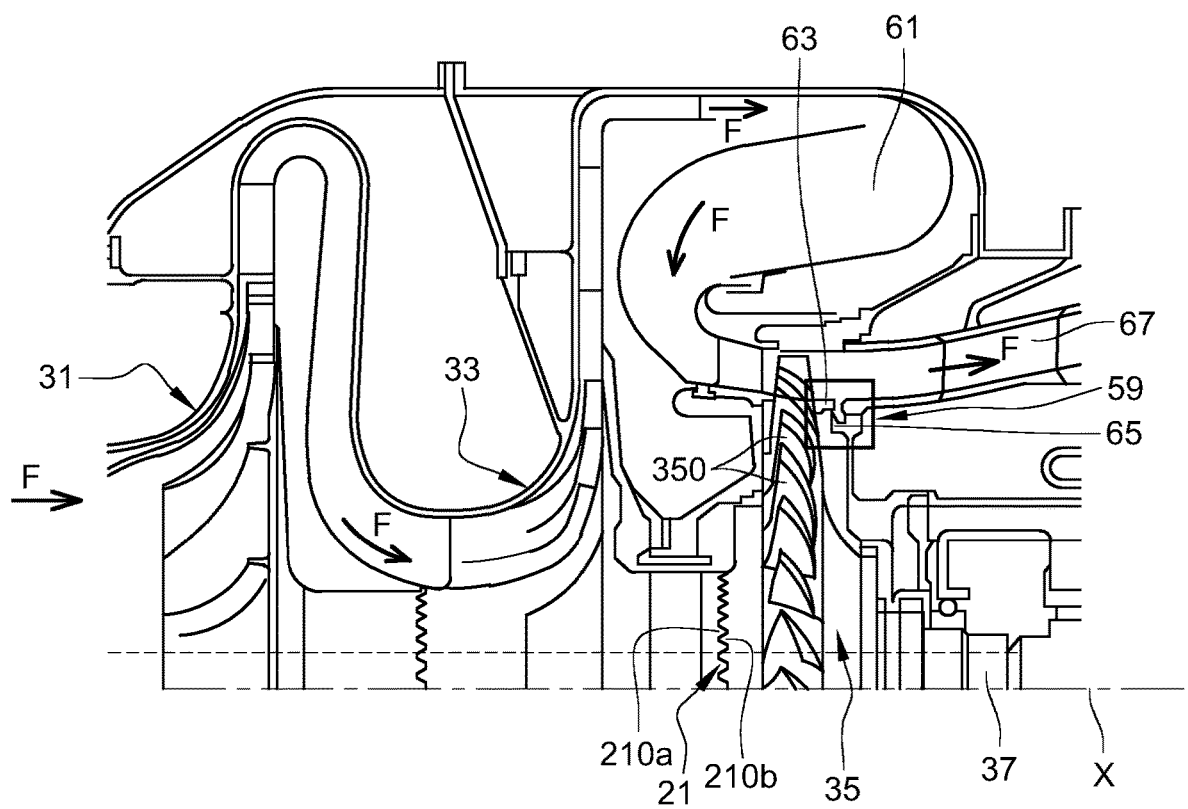
FIG. 8 shows a part 5 of FIG. 3, to locate (in the box marked with a reinforced line) the friction zone of the turbine rotor here to be slowed down, thus in case of curvic couplings disconnection.

Indeed, in the chosen assembly, after being compressed by the low pressure and then high pressure compressors, via the respective rotors 31, 33, a flow F of air is brought to the combustion chamber 61 (FIG. 8) where combustion is taking place in the presence of fuel (via fuel injectors not shown), after which the combustion gases which then form the flow F arrive on the peripheral blades of the high pressure turbine rotor 35.

If at any time the aforementioned uncoupling occurs, the high-pressure turbine rotor 35 and casing 57 of the labyrinth seal 59 thus come into contact, as a result of the tilting created via the protrusion 51.

This contact, which generates friction (f1 FIG. 7), has the effect of creating a torque that opposes the drive torque of the compressor rotor 33 and therefore of controlling the consequences of the uncoupling, tending to avoid an overspeed situation on the part of the rotor of the high pressure turbine 35.

The rotor of the high-pressure turbine 35 should tend to slow down.

Such behaviour imposed on a moving mobile part should allow:
- the engagement of the parts (here coupling halves 210*a*, 210*b*) to be preserved until the mobile part (here the rotor of the high-pressure turbine 35) is blocked,
- to free itself from the link between the engagement stress at the level of the curvature 21 and the axial clearances, this constraint becoming preponderant with the size (length) of modern double-flow gas turbomachines for aircraft,
- to define a numerical method for simulating the behaviour of the considered mobile part.

The parameters to be determined in order to guarantee the aforementioned radial frictional contact at the casing 57, prior to disengagement/decoupling, are:
- the inertia and mass of the rotating components (the above-mentioned rotors),
- the axial thrust applied on these components,
- the rotational speed of the moving part made up of the components,
- the radial clearance between the labyrinth seal 59 of the high-pressure turbine rotor 35 and the static casing, the overhang formed by the protrusion 51 on its splined tooth.

The invention claimed is:

1. A toothed coupling mechanism for an assembly of rotating elements of an aircraft gas turbine engine, comprising:
- a first coupling half and a second coupling half having an axial toothed coupling interface therebetween, the first coupling half having a plurality of first splined teeth, each first splined tooth has a first axial free end, the second coupling half having a plurality of second splined tooth, each second splined tooth having a second axial free end, the first splined teeth being inter-engaged about an axis with the second splined teeth in a situation of splined teeth engagement, for transmitting torque between the first coupling half and the second coupling half; and
- a protrusion located, away from said axis, on the free end of one of the second splined teeth,
- said protrusion projects from the free end of said one of the second splined tooth at a surrounding shoulder and
- one of the first splined tooth is configured to come into contact with said protrusion in a situation of splined teeth disengagement.

2. The mechanism according to claim 1, wherein the protrusion is in the form of a pin secured to the splined tooth.

3. The mechanism according to claim 1, wherein the protrusion is integral with the splined tooth.

4. The mechanism according to claim 1, wherein the protrusion has a perimeter entirely surrounded by the shoulder.

5. The mechanism according to claim 1, wherein said protrusion is located on only one of said splined teeth.

6. An aircraft gas turbomachine provided with the toothed coupling mechanism according to claim 1.

7. A method for controlling consequences of an uncoupling on an axial toothed coupling mechanism of a rotating element assembly of an aircraft gas turbine engine, said mechanism comprising a first coupling half and a second coupling half having an axial toothed coupling interface therebetween, the first coupling half having a plurality of first splined teeth, each first splined tooth has a first axial free end, the second coupling half having a plurality of second splined tooth, each second splined tooth having a second axial free end, the first splined teeth being inter-engaged about an axis with the second splined teeth in a situation of splined teeth engagement to transmit torque therebetween, wherein the method comprises the step of, in an incipiently axially splined teeth disengagement condition, causing a relative pivoting between the first coupling half and a second coupling half about a protrusion located on the free end of one of the second splined teeth, away from said axis that generates friction and tends to slow down the rotation of the rotating element assembly.

* * * * *